United States Patent [19]

Flournoy et al.

[11] 4,253,167

[45] Feb. 24, 1981

[54] METHOD OF MARKING AND DETECTING A PIPELINE LOCATION

[75] Inventors: Norman E. Flournoy; Robert W. Pitts, Jr., both of Houston, Tex.

[73] Assignee: Texaco Inc., White Plains, N.Y.

[21] Appl. No.: 79,765

[22] Filed: Sep. 28, 1979

[51] Int. Cl.³ .............................................. G01S 3/80
[52] U.S. Cl. .................................. 367/118; 367/135; 73/40.5 A
[58] Field of Search .............. 367/118, 135, 136, 137, 367/191; 73/40.5 A

[56] References Cited

U.S. PATENT DOCUMENTS 3,683,325  8/1972  Vlahos ................................ 367/137
4,075,601  2/1978  Flournoy ............................ 367/137

Primary Examiner—Richard A. Farley
Attorney, Agent, or Firm—Carl G. Ries; Robert A. Kulason; Henry C. Dearborn

[57] ABSTRACT

A method of marking a pipeline location eliminates ambiguity in case there are leaks near the location of a marker. It employs a marker that emits two separate frequencies that are modulated by a third frequency lower than either of the other two. Detection of the marker on a pipeline pig is done by separating the two frequencies and demodulating the third. Then by determining the coincidence of all three for a predetermined number of consecutive cycles of the third frequency, the marker location will be positively identified.

8 Claims, 3 Drawing Figures

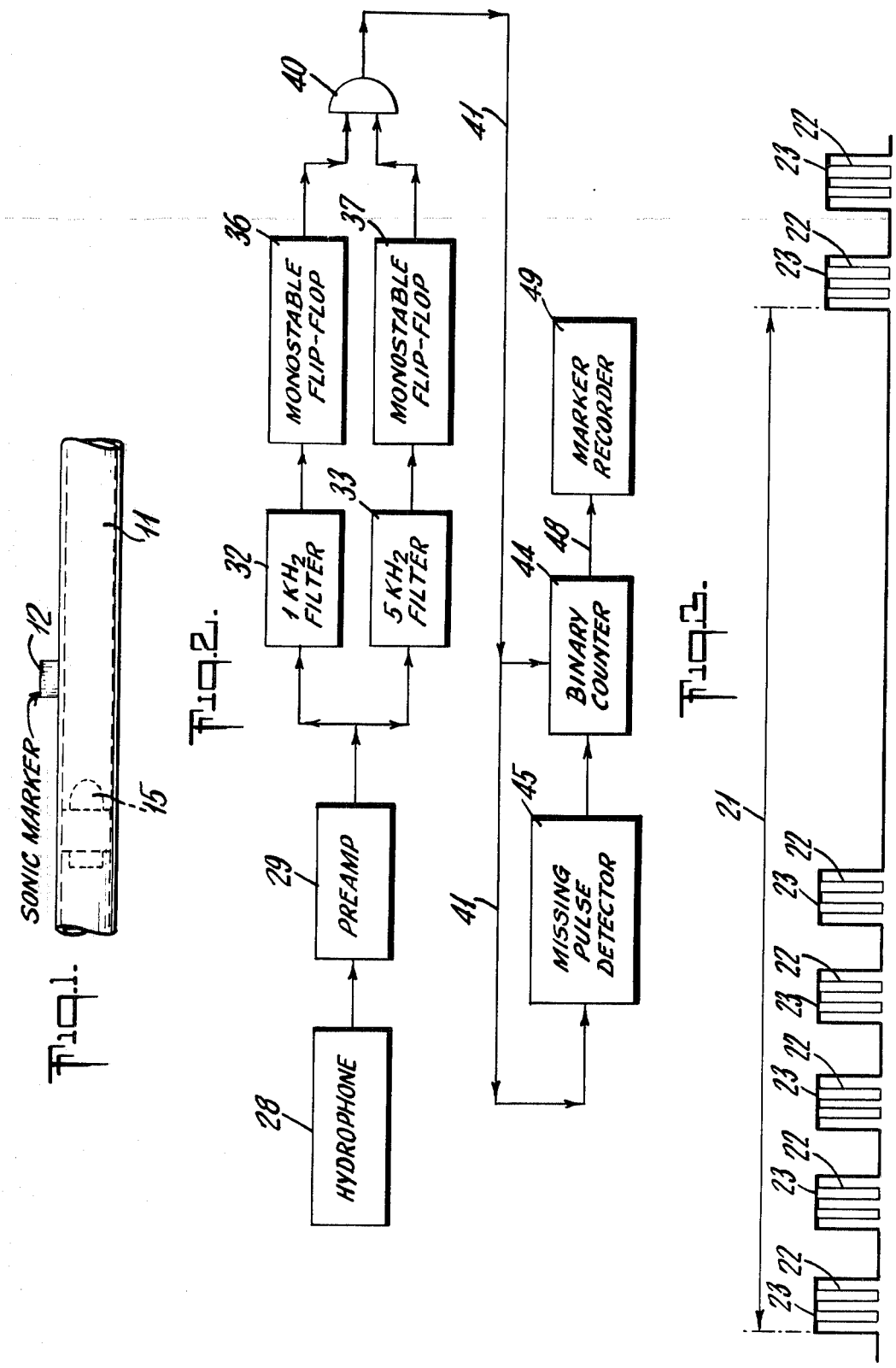

METHOD OF MARKING AND DETECTING A PIPELINE LOCATION

BACKGROUND OF THE INVENTION

1. Field of the Invention

This invention concerns method of marking a pipeline location, in general. More specifically, it relates to an improved method of making a positive identification of a location marker which is applied to a pipeline, and through which pipeline a pig travels with instruments carried thereon for making measurements in the pipeline.

2. Description of the Prior Art

Because of the long distances involved in pipelines and the need to make surveys of conditions therein which must be done by sending a pipeline pig through the line, it is important to be able to accurately determine locations of such pig during its travel through the line. The problem has been recognized by a U.S. Pat. No. 3,409,897 to Bosselaar, et al, which issued Nov. 5, 1968. That patent dealt with the transmission of a pipeline pig through the line for detecting leaks in the line. However, the markers employed (to determine specific locations along the pipeline) made use of an ultrasonic marker that transmitted a particular ultrasonic frequency signal into the pipeline. The signal would be picked up and recorded by the pig as it travelled past. But the leak signals would be in the same ultrasonic frequency range, and it was necessary to rely on the regularity or at least on the expected intervals from the known locations in order to distinguish the marker signals.

Consequently, it is an object of this invention to provide a method of marking and detecting a particular pipeline location, which method is able to positively identify such location whether or not there is noise or leak signals existing in or around the pipeline location.

SUMMARY OF THE INVENTION

Briefly, the invention concerns a method of marking a pipeline location for positive identification upon passing said location by a pipeline pig. The method comprises the steps of continuously emitting into said pipeline two separate signals having different frequencies, and modulating both of said signals by a third signal having a lower frequency than either of said two separate signals. The emission of such signals is done so that detection of a predetermined number of coincidences of all three of the said signals by the pipeline pig, will make the said identification positively.

Again briefly, the invention concerns a method of marking and detecting a pipeline location in connection with a pipeline pig passing through said pipeline. It comprises the steps of continuously emitting into said pipeline (at said location) two separate audio signals having different frequencies, and modulating both signals by a third signal having a lower frequency than either of said two separate signals. It also comprises the steps of receiving and amplifying all three of said signals on said pig, and separating said two signals. In addition, it comprises demodulating said third signal from both of said separated two signals, and determining coincidence of all three signals (for a predetermined number of cycles of said third signal) in order to indicate said pipeline location.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic indication of a pipeline with a marker attached, and a pipeline pig therein;

FIG. 2 is a block diagram, showing the elements involved in the instrumentation of a pipeline pig which is being used for carrying out a method according to the invention; and FIG. 3 is a signal-pulse diagram which illustrates the relationship of three signals in accordance with one particular manner of practicing a method according to the invention.

DESCRIPTION OF THE PREFERRED EMBODIMENT

As indicated above, it is important to be able to exactly locate a pipeline pig as it passes through the pipeline, in making a survey for leaks, or the like. It should be understood throughout this application that the term "pig" is a well known term that describes any of a number of pipeline instruments that may be transmitted through the pipe. It is ordinarily done by means of the flowing fluid in the line. The term pig is generally applied to any such device that is flowed through the pipeline, including pipeline scrapers and the like. However, in the context of this invention it will be clear that the type of pipeline pig being referred to is one that carries instruments, and particularly instruments for detecting sonic signals so as to survey for (or locate) leaks in the line.

Because of the fact that most background noise such as that caused by fluid flow, and the pig moving through the pipeline, is in the audio frequency range, it has been the practice to locate leaks by use of the ultrasonic sound waves generated by a leak. Consequently, the location markers employed also made use of frequency signals that were ultrasonic so that they also could be distinguished from the background noise. That situation led to the difficulty of identifying a pipeline marker as distinguished from a leak signal, when the two were located close together. However, a method according to this invention overcomes that difficulty.

With reference to the drawings, it may be noted that FIG. 1 indicates a pipeline 11 that has a location marker 12 attached thereto. The marker 12 is employed to mark a particular pipeline location for positive identification upon passing that location by a pipeline pig. A pig 15 is illustrated in dashed line, which indicates that it is inside the pipe 11 of the pipeline.

The method of marking the pipeline location, per se, merely comprises the continuous emission into the pipeline of two separate audio signals which have different frequencies, plus the modulation of these by a third audio signal having a lower frequency than either of the other two. It will be appreciated that this may be done in any feasible manner. For example, equipment similar to that illustrated in a U.S. Pat. No. 4,075,601 which issued Feb. 21, 1978, might be employed. However, the capability of transmitting two separate frequencies plus modulating them both, would be added.

It will be clear to anyone skilled in the art that the foregoing modulation might take various forms. Consequently, no particular disclosure of apparatus to carry out the modulation step is deemed necessary.

One form of signals that meet the foregoing criteria is illustrated in FIG. 3. There there is indicated a group of three different frequency signals. A signal cycle of the third or lowest frequency signal is indicated by the distance of an arrow 21. The higher frequency square wave pulses, which represent a 5 kilohertz signal is indicated by a plurality of square wave pulses 22. These are being transmitted within each of a lower frequency set of square wave pulses 23, which represent a one kilohertz signal. These two separate audio frequency signals 22 and 23 are both modulated by a third signal that has the above indicated frequency which is lower than either. The modulation by such lower frequency is indicated by the transmittal of the signals 22 and 23 for only one half cycle of such lower frequency signal. It will be noted that the latter is indicated by the arrow 21 as being a 100 hertz signal.

It may observed that there are five cycles of the signals 23 being transmitted during each complete cycle of the low frequency modulator signal 21. Also, there are two and one half cycles of the highest frequency signals 22 being transmitted during each half cycle of the signals 23. Emission of the three different signals (as indicated) provides a basis for the positive indication in accordance with this invention, as will be described in more detail hereafter.

With reference to FIG. 2, it may be noted that the elements of a system which will be mounted on the pig 15, are shown in block diagram form. Thus, there is a hydrophone 28 that may be like one described in a U.S. Pat. No. 3,744,298 issued July 10, 1973. The output from the hydrophone 28 goes to a preamplifier 29, and then the amplified signals are connected in parallel to the inputs of two notch filters 32 and 33. As indicated by the caption, the filter 32 is designed to pass only a 1 kilohertz signal, e.g. the pulses 23 illustrated in FIG. 3. At the same time, the filter 33 is designed to pass only 5 kilohertz signals, e.g. the pulses 22 illustrated in FIG. 3.

The filtered signals (from the notch filters 32 and 33) go into a pair of monostable flip-flops 36 and 37, respectively. Each of these flip-flops 36 & 37 have a time constant that is equal to a half cycle of the third signal (described above) which has the lowest frequency, i.e. a frequency of 100 hertz as indicated by the length of the arrow 21 in FIG. 3.

The outputs of the monostable flip-flops 36 & 37 go into two individual inputs of an AND gate 40. The output from the AND gate 40 goes over a circuit connection 41 to the inputs of a binary counter 44 and a missing pulse detector 45. There is an output connection 48, from the binary counter 44, which connection goes to a marker recorder 49 where the presence of a marker signal is recorded.

As will be explained in more detail hereafter, the binary counter 44 is arranged to provide an output signal over the connection 48, only after a predetermined number of pulses have been counted. For example, the binary number 256 (to the base 10) may be selected. In which case a time of 2.56 seconds will elapse before that number is reached, at the 100 hertz signal rate.

It will be understood by anyone skilled in the art that the various elements of the block diagram showing in FIG. 2, are generally well known and consequently need not have any more detailed description thereof. For example, the missing pulse detector 45 may be like a circuit this is shown and described in a bulletin published by Texas Instruments identified as bulletin No. DL-S7612053 September 1973—revised June 1976. It has a heading "Linear Integrated Circuits—Types SE555, NE555 Precision Timers". FIGS. 17 and 18 in that bulletin describe a missing pulse detector.

Operation

With references to the figures of the drawings, it may be noted that a method according to this invention deals with marking and detecting a pipeline location. And thus, as indicated in FIG. 11, there is attached to the pipe 11 a sonic signal marker 12 which is continuously emitting into the pipeline liquid two separate audio frequency signals. These may take the form of pulse signals as illustrated in FIG. 3. Thus, there are pulses 22 and 23 which have different frequencies. These two different frequency audio signals are modulated by a third signal which has a lower frequency than either of the two separate signals 22 or 23. This third signal is illustrated in FIG. 3. It is a 100 hertz modulation which is indicated by the single cycle pulse length 21. It will be noted that during each half cycle of the pulse cycle 21, the two higher frequency signal pulses 21 & 23 appear while during the other half cycle they are suppressed.

The marker signal that is being transmitted continuously into the pipeline fluid is detected by instruments on a pipeline pig, e.g the pig 15 illustrated. Such instruments include those indicated by the FIG. 2 block diagram. The hydrophone 28 picks up all three signals and transmits them by a preamplifier 29 into the parallel inputs of the filters 32 & 33. These filters pass only the particular frequencies indicated, i.e. filter 32 passes the 1 kilohertz pulses 23, while the filter 33 passes the 5 kilohertz pulses 22.

The output signals from filters 32 & 33 are demodulated according to the modulation at the output of the marker 12, by having the two monostable filp-flops 36 & 37 connected to the filters. The time constants for both of these flip-flops 36 & 37 are set at one half cycle of the low frequency third signal, i.e. 100 hertz, in the indicated illustrations.

The output signals from both of the flip-flops 36 & 37 go to two inputs of the AND gate 40. Consequently, whenever both signals are present there will be a signal passed through over the circuit connection 41 which goes to both the binary counter 44 and the missing pulse detector 45. If either of the first two higher frequency audio signals passing through the filters 32 and 33 are missing there will be no signal output from the gate 40. Thus, so long as there are inputs from both filtered signals to the flip-flops 36 & 37, output signals from the AND gate 40 will go to the binary counter 45 and the count will be made in a continuous manner. In other words, so long as all three signals continue to be present, the counter 44 will continue to accumulate its count toward the predetermined total of 256. However, should either of the filter output signals be missing there is no signal out through the AND gate 40, and the missing pulse detector 45 picks up this condition and provides and output signal. That output signal goes to the binary counter 44 and resets the counter. Therefore, unless there are continuous signals through both filters 32 & 33 that are both together at the inputs of the flip-flops 36 & 37 the binary counter 44 will not continue to count but will be reset by the output from the missing pulse detector 45.

It will be noted that the total binary number count is selected so as to provide an output signal from the counter 44 to the marker-recorder 49 that is large enough to insure the positive identification of the marker output. This is so since random signals of the two frequencies which the filters 32 & 33 pass would not occur continuously for the predetermined length of time. In the illustrated example the frequencies are such that there will be 2.56 seconds before the total count of 256 is reached. It may be noted that such time (2.56 seconds) requires that the output signal from the marker 12 must be received over a distance of only about ten feet of instrument travel of the pig 15, when a typical fluid velocity of three to six feet per second is considered.

It will be noted that the arrangement provides for a positive identification of the marker signal. And, it will not be confusable with any leak signal in the ultra-sonic range that might be located near the marker. Similarly, leak signals that might exist with components in the audio frequency range, would not meet the requirements of the detection system because they would not provide continuously the two audio frequencies modulated by a third lower frequency.

It will be understood that the principles of the invention are applicable to other than audio frequencies, so long as they may be transmitted from the marker to the pig.

While a particular embodiment of the invention has been described above in considerable detail in accordance with the applicable statutes, this is not to be taken as in any way limiting the invention but merely as being descriptive thereof.

We claim:

1. Method of marking a pipeline location for positive identification upon passing said location by a pipeline pig, comprising the steps of
   continuously emitting into said pipeline two separate signals having different frequencies, and
   modulating both of said signals by a third signal having a frequency lower than either of said two separate signals,
   whereby detection of a predetermined number of coincidences of all three of said signals by said pig will make said positive identification.

2. Method of marking and detecting a pipeline location in connection with a pipeline pig passing through said pipeline, comprising the steps of
   continuously emitting into said pipeline at said location two separate signals having different frequencies and modulating both by a third signal having a lower frequency than either of said two separate signals,
   receiving and amplifying all three of said signals on said pig,
   separating said two signals,
   demodulating said third signal from both of said separated two signals, and
   determining coincidence of all three signals for predetermined number of cycles of said third signal in order to indicate said pipeline location.

3. Method according to claim 2, wherein
   said step of separating said two signals comprises filtering at each of said two signal frequencies.

4. Method according to claim 3, wherein
   said step of demodulating said third signal comprises transforming both said filtered signals to said third signal frequency.

5. Method according to claim 4, wherein
   said step of determining coincidence comprises gating said transformed filtered signals to pass a transformed signal only when both said filtered signals are present, and counting the number of consecutive passed transformed signals up to a predetermined number.

6. Method according to claim 5, wherein
   said counting of consecutive passed signals comprises detecting a missing signal and resetting the count to begin again.

7. Method of marking and detecting a pipeline location in connection with a pipeline pig passing through said pipeline, comprising the steps of
   continuously emitting into said pipeline at said location two separate audio signals having different frequencies and modulating both by a third signal having a lower frequency than either of said two separate signals,
   receiving and amplifying all three of said signals on said pig while traveling through said pipeline,
   filtering said signals to pass each of said separate two signals individually,
   transforming both said filtered signals by actuating individual monostable flip-flops having a time constant of a half cycle of said third signal,
   passing the outputs of said monostable flip-flops to an AND gate for passing through said half cycle signals only when both filtered signals are present,
   connecting said half cycle signals passed through said AND gate to a binary counter and to a missing pulse detector,
   resetting said binary counter whenever a missing pulse is detected, and
   actuating an indicator of said pipeline location when a predetermined number is reached by said binary counter.

8. Method according to claim 7, wherein
   said two separate audio signal frequencies are one and five kilohertz, and
   said third signal frequency is one hundred hertz.

* * * * *